(12) United States Patent
Scheer et al.

(10) Patent No.: US 12,234,032 B2
(45) Date of Patent: Feb. 25, 2025

(54) QUICK-CONNECT FITTINGS FOR CONVERTIBLE CARGO HANDLING ASSEMBLIES

(71) Applicant: GOODRICH CORPORATION, Charlotte, NC (US)

(72) Inventors: Dustin Paul Scheer, Jamestown, ND (US); Wesley K Stegmiller, Jamestown, ND (US); Kevin Setterstrom, Jamestown, ND (US); Aaron J Roberts, Jamestown, ND (US); Scott P Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 66 days.

(21) Appl. No.: 17/994,714

(22) Filed: Nov. 28, 2022

(65) Prior Publication Data
US 2023/0085625 A1    Mar. 23, 2023

Related U.S. Application Data (62) Division of application No. 16/260,868, filed on Jan. 29, 2019, now Pat. No. 11,542,005.

(51) Int. Cl.
| | |
|---|---|
| *B60P 7/08* | (2006.01) |
| *B64C 1/20* | (2006.01) |
| *B64D 9/00* | (2006.01) |
| *B65G 39/02* | (2006.01) |
| *B65G 39/12* | (2006.01) |
| *F16B 5/00* | (2006.01) |

(52) U.S. Cl.
CPC ............ *B64D 9/003* (2013.01); *B60P 7/0807* (2013.01); *B64C 1/20* (2013.01); *B65G 39/025* (2013.01); *B65G 39/12* (2013.01); *F16B 5/0004* (2013.01); *B65G 2207/30* (2013.01)

(58) Field of Classification Search
CPC ......... B60P 1/6409; B60P 1/649; B60P 3/423; B60P 7/08; B60P 7/0807; B60P 1/423
USPC .... 410/46, 69, 77, 80, 90, 91, 106, 110, 116
See application file for complete search history.

(56) References Cited

U.S. PATENT DOCUMENTS

| | | | |
|---|---|---|---|
| 4,222,695 A | 9/1980 | Sarides | |
| 4,457,649 A | 7/1984 | Vogg | |
| | (Continued) | | |

FOREIGN PATENT DOCUMENTS

| | | |
|---|---|---|
| CN | 102022408 | 4/2011 |
| CN | 105339683 | 2/2016 |
| | (Continued) | |

OTHER PUBLICATIONS

USPTO, Supplemental Notice of Allowance dated Dec. 7, 2022 in U.S. Appl. No. 16/260,868.
(Continued)

*Primary Examiner* — Stephen T Gordon
(74) *Attorney, Agent, or Firm* — SNELL & WILMER L.L.P.

(57) ABSTRACT

A quick-connect fitting for a convertible cargo handling assembly may comprise a fixed portion and a coupling component. The fixed portion may be secured to an aircraft frame structure. The coupling component may be coupled to a removable cargo handling component. The coupling component may be configured to rotate relative to the fixed portion.

4 Claims, 11 Drawing Sheets

(56) References Cited

U.S. PATENT DOCUMENTS

| | | | |
|---|---|---|---|
| 4,780,043 A | 10/1988 | Fenner | |
| 4,805,852 A | 2/1989 | Nordstrom | |
| 5,051,047 A * | 9/1991 | Loncaric | B60P 7/0815 |
| | | | 410/77 |
| 6,439,815 B1 | 8/2002 | Liu | |
| 7,007,786 B2 | 3/2006 | Huber et al. | |
| 7,390,155 B1 * | 6/2008 | Diaz | B60P 7/0807 |
| | | | 410/106 |
| 7,530,773 B2 | 5/2009 | Kress | |
| 8,342,448 B2 | 1/2013 | Huber et al. | |
| 9,033,632 B2 | 5/2015 | Komsitsky | |
| 9,260,176 B2 * | 2/2016 | Kulesha | B64C 1/20 |
| 10,457,376 B1 * | 10/2019 | Koman | B64C 1/20 |
| 10,773,784 B2 | 9/2020 | Huber | |
| 11,542,005 B2 * | 1/2023 | Scheer | B64D 9/003 |
| 2002/0098052 A1 | 7/2002 | Liu | |
| 2005/0224645 A1 | 10/2005 | Huber | |
| 2012/0304579 A1 | 12/2012 | Dezoete | |
| 2013/0014376 A1 | 1/2013 | Komsitsky et al. | |
| 2013/0309036 A1 * | 11/2013 | Holzner | B60P 7/0815 |
| | | | 410/69 |
| 2014/0202824 A1 | 7/2014 | Esser et al. | |
| 2016/0194083 A1 | 7/2016 | Himmelmann | |
| 2016/0318608 A1 | 11/2016 | Himmelmann | |
| 2018/0111674 A1 | 4/2018 | Huber et al. | |
| 2018/0273300 A1 | 9/2018 | Weisfelner et al. | |
| 2018/0290724 A1 | 10/2018 | Nowarre et al. | |
| 2019/0210728 A1 | 7/2019 | Pfau | |

FOREIGN PATENT DOCUMENTS

| | | |
|---|---|---|
| CN | 106337867 | 1/2017 |
| CN | 108284957 | 7/2018 |
| EP | 214146 | 9/1988 |
| EP | 1312812 | 5/2003 |
| EP | 2907750 | 8/2015 |
| JP | 2010173765 | 8/2010 |

OTHER PUBLICATIONS

Chinese Patent Office, Chinese Office Action dated Jan. 24, 2024 in Application No. 202010016804.6.

USPTO, Restriction/Election Requirement dated Dec. 15, 2021 in U.S. Appl. No. 16/260,868.

USPTO, Preinterview First Office Action dated Apr. 12, 2022 in U.S. Appl. No. 16/260,919.

USPTO, Pre-Interview First Office Action dated May 19, 2022 in U.S. Appl. No. 16/260,868.

USPTO, Notice of Allowance dated Sep. 1, 2022 in U.S. Appl. No. 16/260,868.

USPTO, Notice of Allowance dated Sep. 22, 2022 in U.S. Appl. No. 16/260,919.

USPTO, Notice of Allowance dated Nov. 21, 2022 in U.S. Appl. No. 16/260,919.

Chinese Patent Office, Chinese Office Action dated Mar. 14, 2024 in Application No. 201911293616.1.

Chinese Patent Office, Chinese Office Action dated Aug. 30, 2024 in Application No. 201911293616.1.

Chinese Patent Office, Chinese Office Action dated Aug. 30, 2024 in Application No. 202010016804.6.

* cited by examiner

QUICK-CONNECT FITTINGS FOR CONVERTIBLE CARGO HANDLING ASSEMBLIES

CROSS-REFERENCE TO RELATED APPLICATIONS

This application is a divisional of, claims priority to and the benefit of, U.S. patent application Ser. No. 16/260,868, filed Jan. 29, 2019, and titled "QUICK-CONNECT FITTINGS FOR CONVERTIBLE CARGO HANDLING ASSEMBLIES," which is incorporated by reference herein in its entirety for all purposes.

FIELD

The present disclosure relates generally to cargo handling systems, and more specifically, to quick-connect fittings for convertible cargo handling assemblies.

BACKGROUND

Aircraft cargo handling systems are generally configured either for containerized cargo, often referred to as unit load devices (ULDs), or for bulk cargo. Current aircraft cargo handling systems do not provide flexibility to easily transition between containerized handling systems and bulk handling systems. For example, current cargo handling systems may have hardware associated with containerized systems (e.g., guide rails and power drive units) permanently mounted to the aircraft. The permanently mounted hardware adds unnecessary weight, takes up space, and can cause snags, or other interferences, when loading bulk cargo. Additionally, cargo handling systems, which do not permanently attach the hardware, tend to utilize track fittings for hardware attachment. These track fitting are susceptible to foreign object debris and may create uneven surfaces that can cause snags, or other interferences, when loading bulk cargo.

SUMMARY

A quick-connect fitting for a convertible cargo handling assembly is disclosed herein. In accordance with various embodiments, the quick-connect fitting may comprise a fixed portion configured to be secured to an aircraft frame structure, and a coupling component coupled to a removable cargo handling component of the convertible cargo handling assembly. The coupling component may be configured to rotate relative to the fixed portion.

In various embodiments, the fixed portion may comprise a threaded post. In various embodiments, the fixed portion may further comprise a base portion defining a threaded orifice, and a threaded cup located within the threaded orifice.

In various embodiments, the threaded cup may include a recessed surface. In various embodiments, a cap may be located over the recessed surface.

In various embodiments, the removable cargo handling component may comprise at least one of a ball mat, a roller tray, or a side guide.

A convertible cargo handling assembly is also disclosed herein. In accordance with various embodiments, the convertible cargo handling assembly may comprise a mat and a quick-connect fitting comprising a fixed portion located within an opening in the mat, and a coupling component configured to rotate relative to the fixed portion. A removable cargo handling component may be removably coupled to the fixed portion of the quick-connect fitting.

In various embodiments, a surface of the mat may be flush with a surface of the fixed portion of the quick-connect fitting. In various embodiments, a portion of the mat may be located over a flange of the fixed portion of the quick-connect fitting.

In various embodiments, the coupling component may comprise a head portion located at a first surface of the removable cargo handling component, and a threaded portion located at a second surface of the removable cargo handling component opposite the first surface. In various embodiments, the fixed portion may comprise a threaded post configured to engage the threaded portion of the coupling component.

In various embodiments, the fixed portion may further comprise a base portion defining a threaded orifice, and a threaded cup located within the threaded orifice. In various embodiments, the removable cargo handling component may comprise at least one of a ball mat, a roller tray, or a side guide.

In various embodiments, a surface of the coupling component may be configured to be flush with a surface of the fixed portion, when the quick-connect fitting is in an unsecured position.

In various embodiments, the removable cargo handling component may define a channel configured to receive the coupling component. The removable cargo handling component may include a protrusion located in the channel.

In various embodiments, when the quick-connect fitting is in a secured position, the protrusion may be located between the coupling component and the surface of the fixed portion.

In accordance with various embodiments, a convertible cargo handling assembly may comprise a mat and a quick-connect fitting located in an opening in the mat. The quick-connect fitting may comprise a fixed portion including a surface flush with a surface of the mat.

In various embodiments, the quick-connect fitting may further include a coupling component configured to rotate relative to the fixed portion, and a biasing member coupled between the fixed portion and the coupling component. In various embodiments, a surface of the coupling component may be configured to be flush with the surface of the fixed portion and the surface of the mat, when the quick-connect fitting is in an unsecured position.

In various embodiments, a removable cargo handling component may be removably coupled to the fixed portion of the quick-connect fitting. The removable cargo handling component may include a protrusion located in a channel defined by the removable cargo handling component. When the quick-connect fitting is in a secured position, the protrusion may be located between the coupling component and the surface of the fixed portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching and surface shading lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Convertible cargo handling assemblies, as disclosed herein, may be configured to easily convert between handling containerized cargo (or ULDs), wherein multiple cargo items are bundled into containers and the containers are loaded into and out of an aircraft, and handling bulk cargo, wherein cargo items are loaded individually into and out of an aircraft. In accordance with various embodiments, the cargo handling components employed for containerized cargo may be removably coupled via quick-connect fittings. The quick-connect fittings may allow the containerized components to be quickly and easily installed and removed. When the containerized components are removed, the surface of the cargo area (e.g., the floor and walls) may be flush, thereby reducing the likelihood that bulk cargo will snag.

Figure 1:
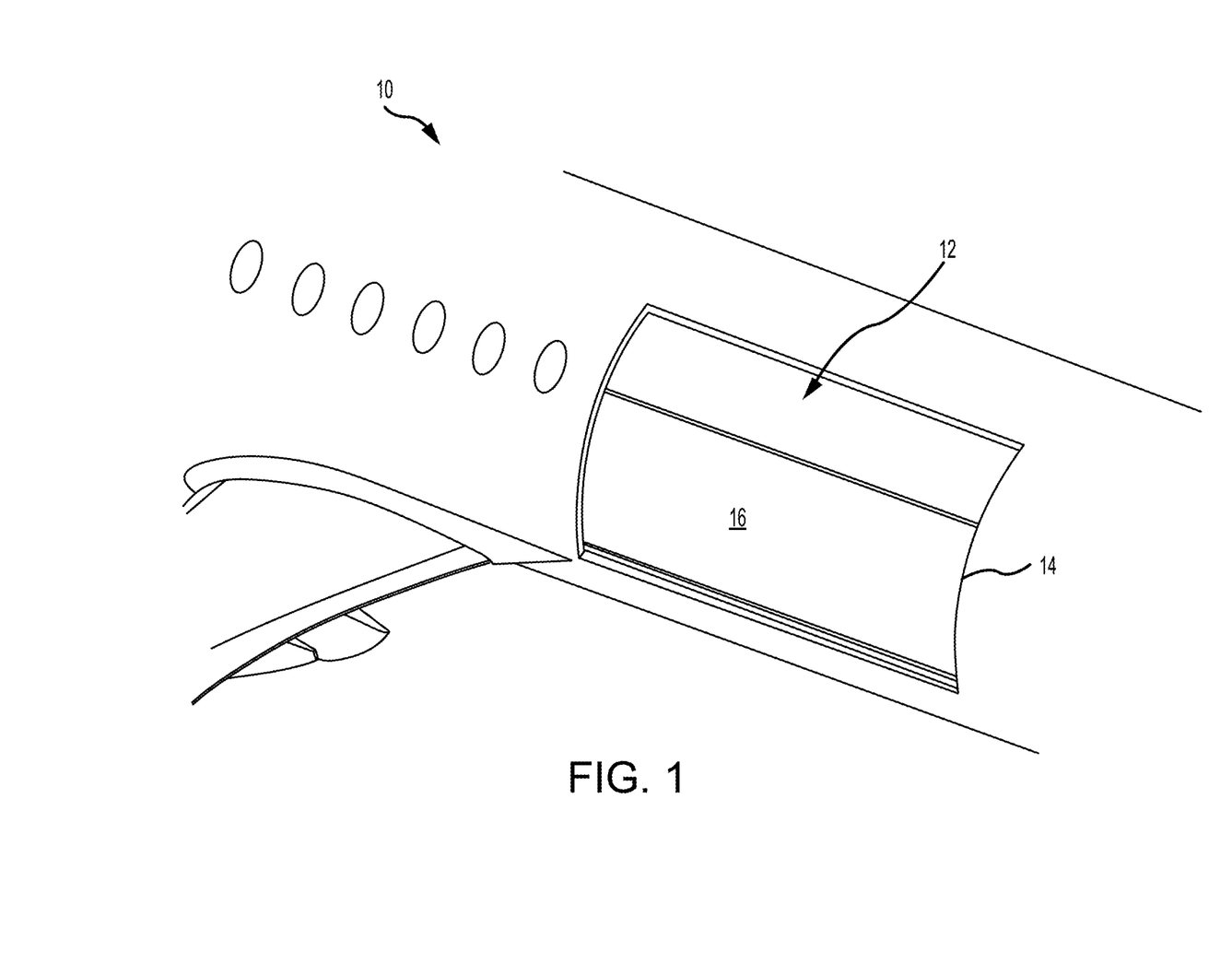
- FIG. 1 illustrates a perspective view of an aircraft cargo compartment, in accordance with various embodiments.

With reference to FIG. 1, an aircraft 10 having a cargo compartment 12 is illustrated. A cargo door 14 provides access to cargo compartment 12. Cargo (e.g., pallet, ULDs, and/or bulk cargo) may be loaded and unloaded through cargo door 14 and onto a cargo deck 16.

Figure 2A:
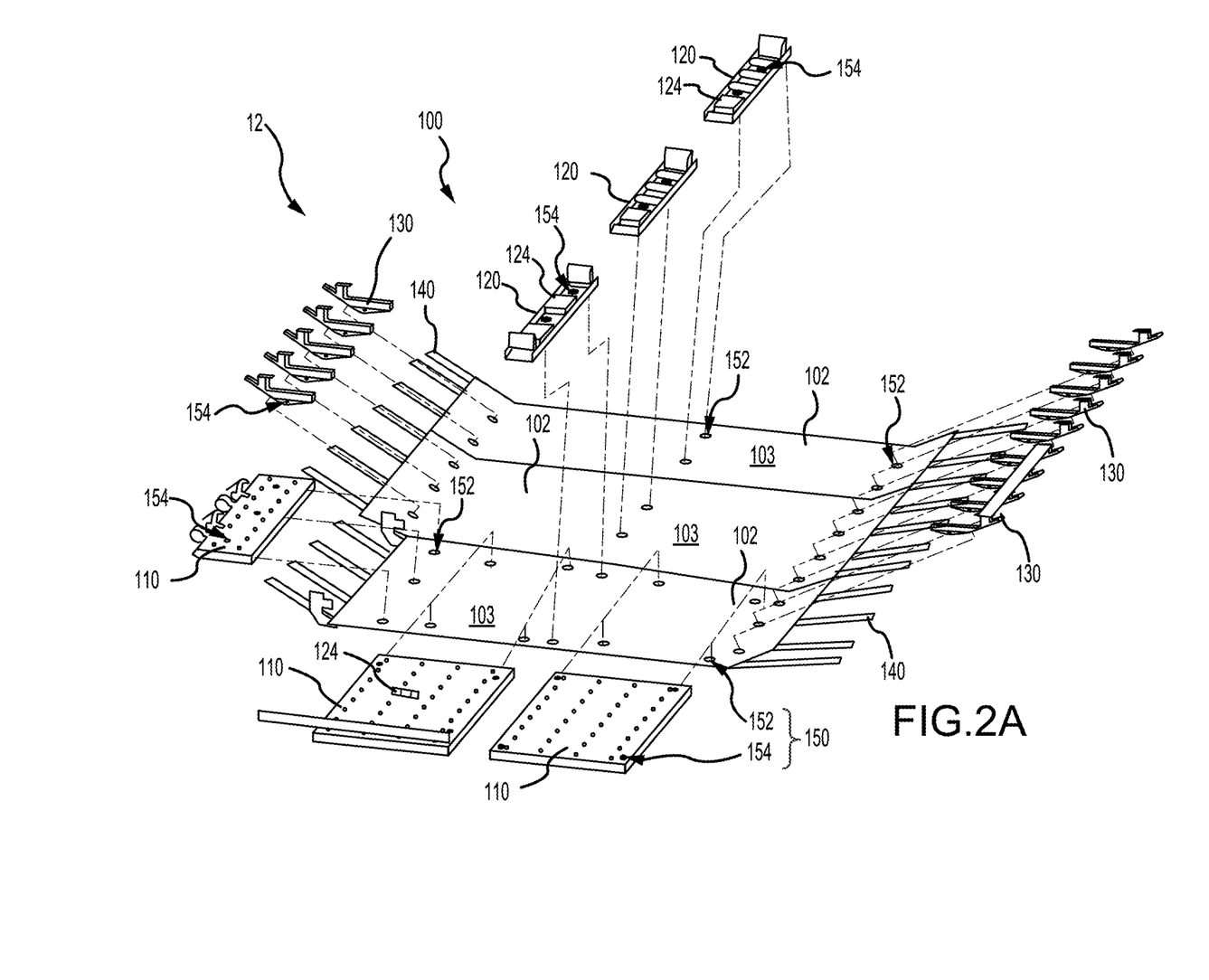
FIG. 2A illustrates an assembly view of a convertible cargo handling assembly, in accordance with various embodiments.
Figure 2B:
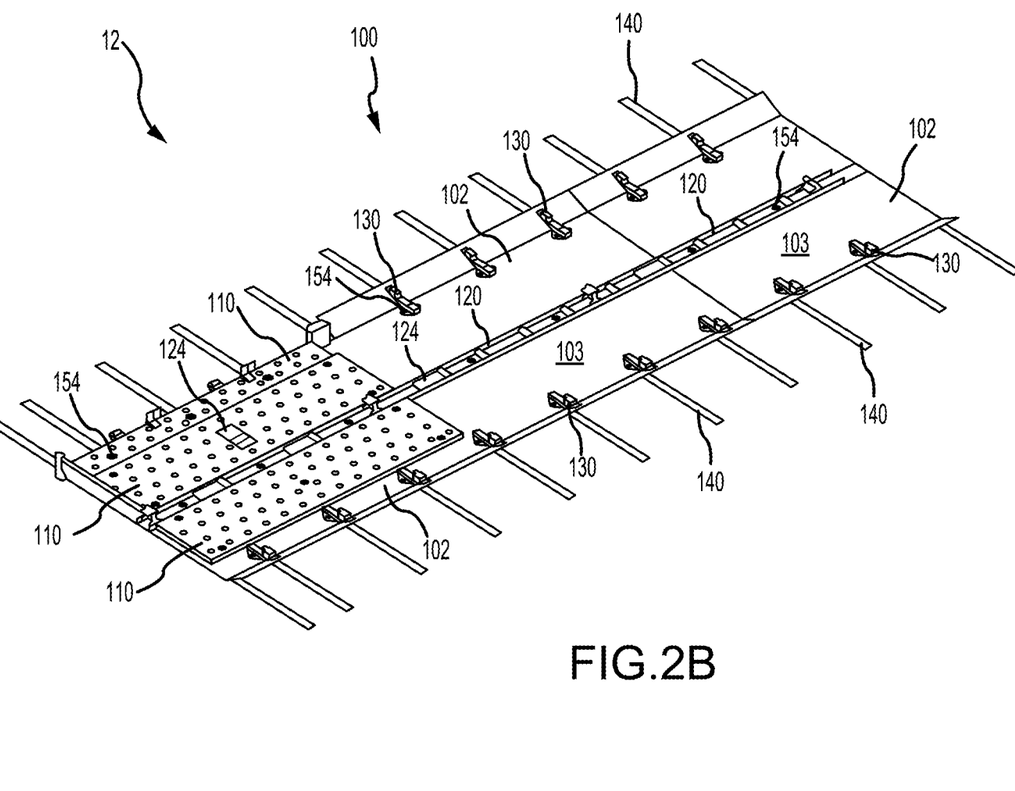
FIG. 2B illustrates a convertible cargo handling assembly configured for handling containerized cargo, in accordance with various embodiments.
Figure 2C:
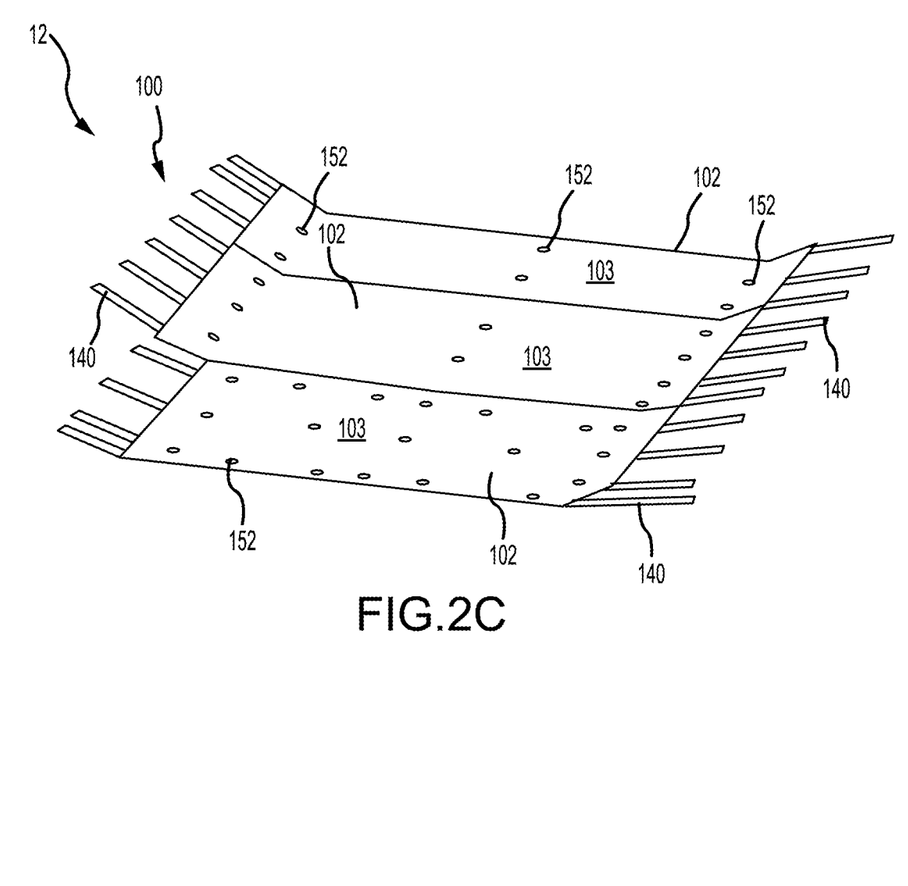
FIG. 2C illustrates a convertible cargo handling assembly configured for handling bulk cargo, in accordance with various embodiments.

With reference to FIGS. 2A, 2B, and 2C, a convertible cargo handling assembly 100, which may be located within cargo compartment 12, is illustrated. In accordance with various embodiments, convertible cargo handling assembly 100 may be converted between a containerized mode (FIG. 2B), configured to handle containerized cargo, and a bulk mode (FIG. 2C) for handling bulk cargo items individually. Convertible cargo handling assembly 100 comprises a plurality of mats 102. Mats 102 may line cargo compartment 12. For example, mats 102 are located along the floor and walls of cargo compartment 12. Mats 102 are located over aircraft frame structures 140. In this regard, mats 102 may form cargo deck 16, with momentary reference to FIG. 1. In various embodiments, convertible cargo handling assembly 100 includes components configured to facilitate translation of containerized cargo over mats 102. For example, convertible cargo handling assembly 100 may include ball mats 110, roller trays 120, and guide rails 130. Ball mats 110 may be located proximate cargo door 104, with momentary reference to FIG. 1. Convertible cargo handling assembly 100 may be equipped with one or more power drive units (PDUs) 124 configured to propel containerized cargo in a desired direction. PDUs 124 may be located in roller trays 120 and/or in ball mats 110. As discussed in further detail below, ball mats 110, roller trays 120, and guide rails 130 are each removably coupled to aircraft frame structures 140 via one or more quick-connect fitting(s) 150.

Quick-connect fittings 150 each include a fixed portion 152 attached to an aircraft frame structure 140 and one or more coupling component(s) 154 attached to a removable cargo handling component (i.e., attached to a ball mat 110, a roller tray 120, or a guide rail 130). The coupling components 154 may rotate relative to, and form a threaded engagement with, the fixed portions 152 to secure ball mats 110, roller trays 120, and guide rails 130 to fixed portions 152 and aircraft frame structures 140. Fixed portions 152 are located within openings defined by mats 102. A surface 162, with momentary reference to FIG. 3A, of fixed portion 152 is configured to be flush, or even, with a surface 103 of mats 102. Surface 162 of fixed portion 152 and surface 103 of mats 102 are configured such that, when ball mats 110, roller trays 120, and guide rails 130 are removed, the floor and walls of cargo compartment 12 comprise smooth, planar surfaces. When convertible cargo handling assembly 100 is in a containerized mode (FIG. 2B), ball mats 110, roller trays 120, and guide rails 130 are attached to fixed portions 152.

When convertible cargo handling assembly 100 is in the containerized mode, at least a portion of each ball mat 110, roller tray 120, and guide rails 130 is located on and/or overlaps surface 103 of mats 102. When convertible cargo handling assembly 100 is in a bulk mode (FIG. 2C), ball mats 110, roller trays 120, and guide rails 130 are removed from cargo compartment 12, while fixed portions 152 and mats 102 remain attached. In various embodiments, ball mats 110, roller trays 120, and guide rails 130 are secured to aircraft frame structures 140 independently of one another. Stated differently, each ball mat 110, roller tray 120, and guide rail 130 is secured via its own dedicated quick-connect fitting 150, as opposed to via a coupling to an adjacent ball mat 110, roller tray 120, and/or guide rail 130. In various embodiments, ball mats 110, roller trays 120, and/or guide rails 130 may be secured to aircraft frame structures 140 solely via quick-connect fittings 150.

Figure 3A:
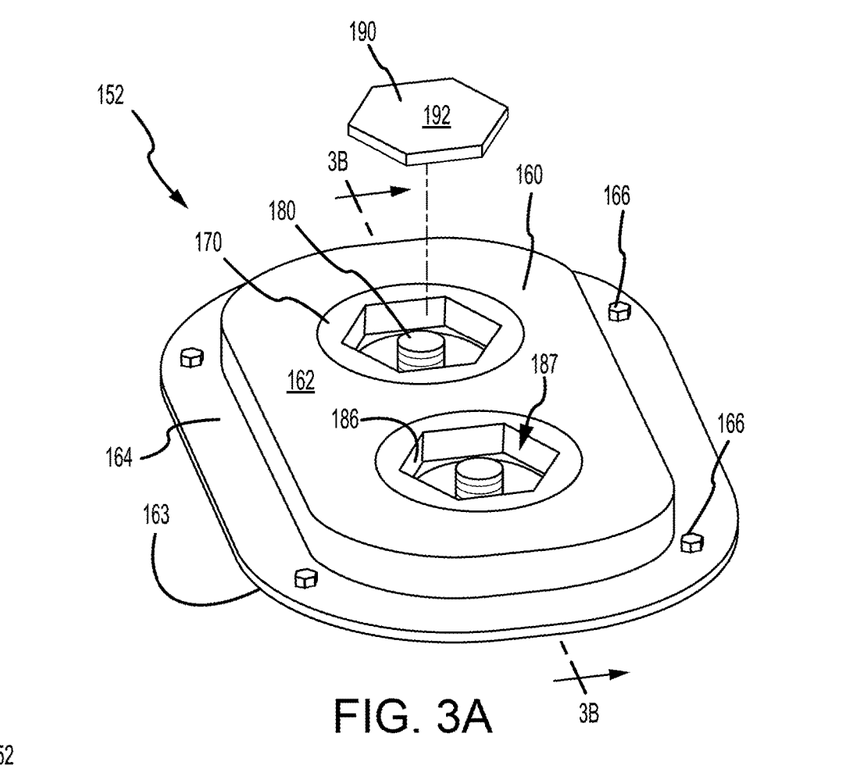
FIGS. 3A and 3B illustrate a fixed portion of a quick-connect fitting, in accordance with various embodiments.
Figure 3B:
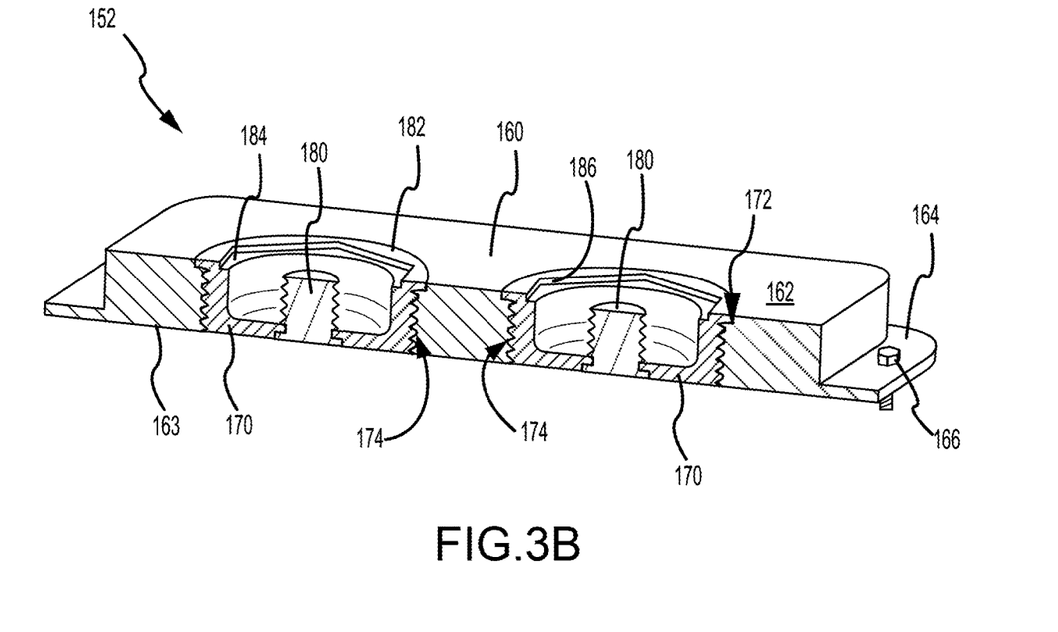

With reference to FIGS. 3A and 3B, fixed portion 152 of a quick-connect fitting 150 is illustrated. In various embodiments, fixed portion 152 includes a base portion 160. Base portion 160 includes a flange 164. Flange 164 may be located proximate a second surface 163 of base portion 160. Second surface 163 may be opposite and oriented away from surface 162 of base portion 160. When installed, mats 102, with momentary reference to FIG. 2A, may be located on or over flange 164, such that a portion of mat 102 overlaps flange 164. Fixed portion 152 may be secured to aircraft frame structures 140 (FIG. 2A) via fasteners 166. Fasteners 166 may include screws, rivets, clips, nuts and bolts, or any other fastening device. In various embodiments, fasteners 166 may be located through flange 164.

One or more threaded cups 170 may be located in base portion 160 of fixed portion 152. Base portion 160 may define a threaded orifice 172 configured to engage a threaded surface 174 of threaded cup 170. A threaded post 180 may be located in threaded cups 170. Threaded cups 170 include a surface 182 that is flush or planar with surface 162 of base portion 160. In various embodiments, threaded cups 170 further include a recessed surface 184 and walls 186 extending between recessed surface 184 and surface 182. Walls 186 may define a tool orifice 187 configured to receive and engage a tool having a geometry that is complementary to tool orifice 187. In this regard, tool orifice 187 is configured to engage a tool that facilitates rotating threaded cups 170, relative to base portion 160, to install threaded cups 170 into and/or remove threaded cups 170 from threaded orifices 172 in base portion 160.

In various embodiments, quick-connect fitting 150 may include a cap 190. Cap 190 may be placed on recessed surface 184, when convertible cargo handling assembly 100 is in bulk cargo mode. Cap 190 is configured such that surface 192 of cap 190 will be flush with surface 162 of base portion 160. Cap 190 may reduce or prevent debris from accumulating in the volume between threaded cup 170 and threaded post 180. The spacing between threaded post 180 and the interior walls of threaded cup 170 (i.e., the walls opposite threaded surface 174) tends to allow any debris which may be located in threaded cup 170 to be easily detected and/or removed.

Figure 4A:
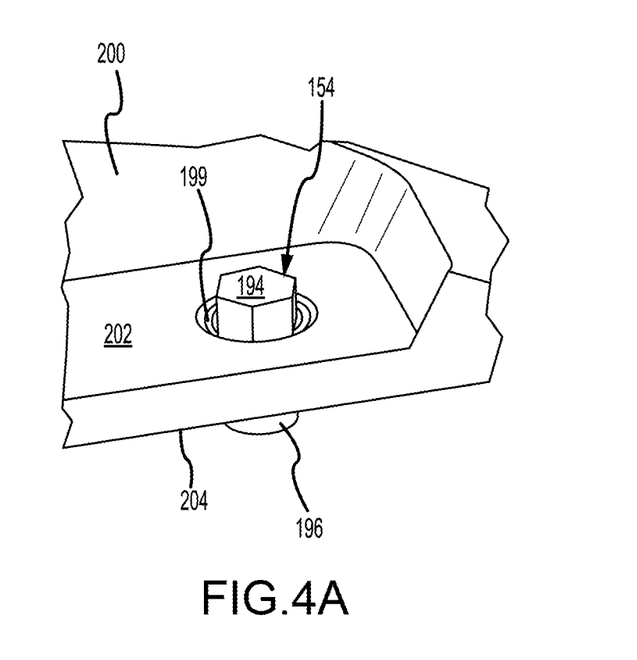
FIGS. 4A and 4B illustrate a removable cargo handling component having a coupling component of a quick-connect fitting attached thereto, in accordance with various embodiments.
Figure 4B:
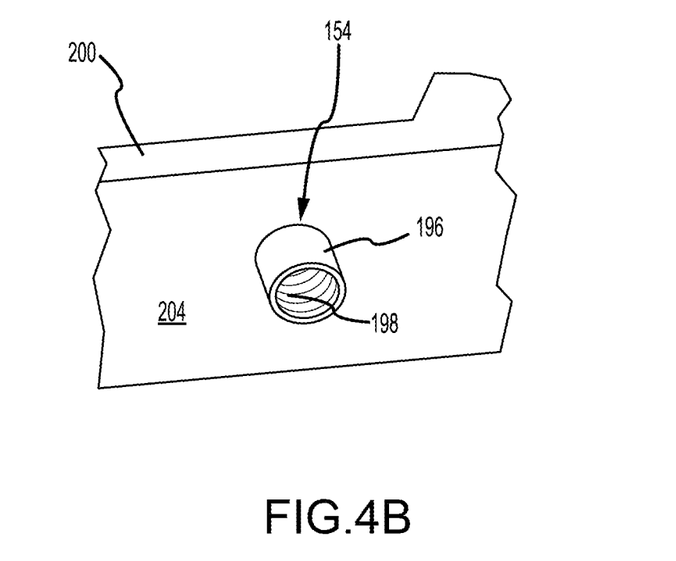

With reference to FIGS. 4A and 4B, a coupling component 154 attached to a removable cargo handling component 200 is illustrated, in accordance with various embodiments. Removable cargo handling component 200 may be a ball mat 110, a roller tray 120, or a guide rail 130 of convertible cargo handling assembly 100, with momentary reference to FIG. 2A. A head portion 194 of coupling component 154 is located at a first surface 202 of removable cargo handling component 200. A threaded portion 196 of coupling component 154 is located at a second surface 204 of removable cargo handling component 200. Second surface is opposite first surface 202 and is oriented toward fixed portion 152, with momentary reference to FIG. 5, when attaching removable cargo handling component 200 to fixed portion 152. Threaded portion 196 of coupling component 154 includes a threaded surface 198.

Figure 5:
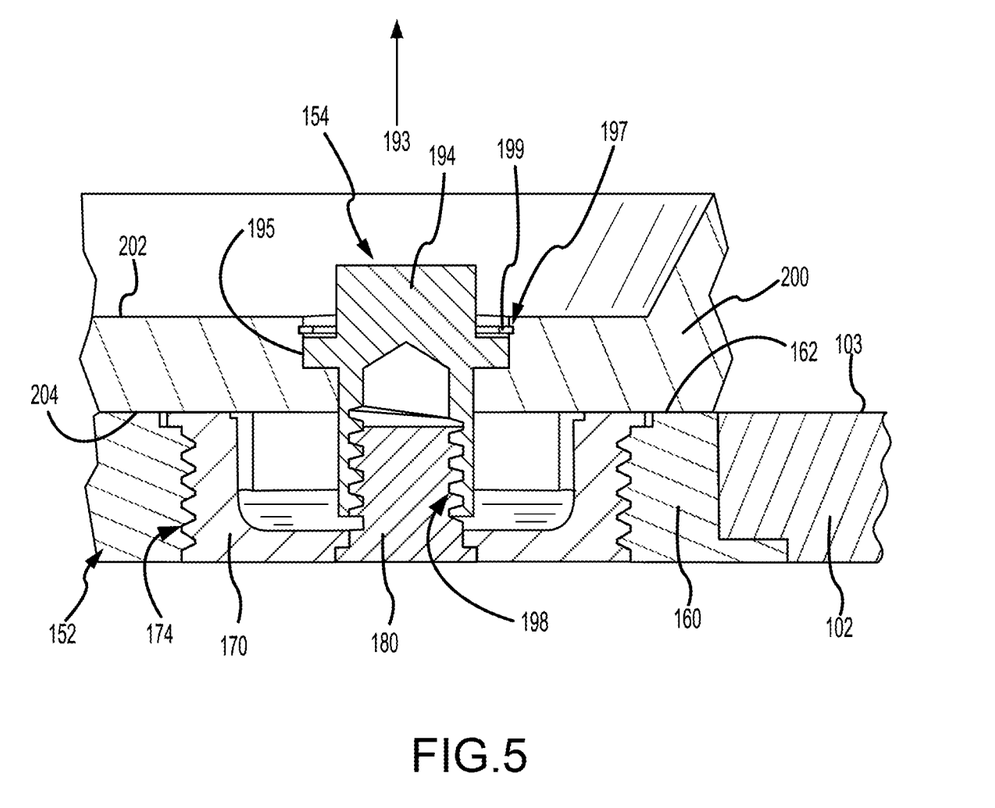
FIG. 5 illustrates a removable cargo handling component coupled to the fixed portion of quick-connect fitting, in accordance with various embodiments.

With reference to FIG. 5, removable cargo handling component 200 is illustrated secured to fixed portion 152 of quick-connect fitting 150. Threaded post 180 engages threaded surface 198 of coupling component 154. Second surface 204 of removable cargo handling component 200 may be located on or over surface 162 of base portion 160. Coupling component 154 engaging threaded post 180 of fixed portion 152 secures removable cargo handling component 200 to fixed portion 152 and aircraft frame structures 140 (FIG. 2A). To remove removable cargo handling component 200, an operator rotates coupling component 154 to disengage coupling component 154 from threaded post 180.

In various embodiments, coupling component 154 may include a lip 195 formed around head portion 194. A width or diameter of lip 195 is greater than a width or diameter of head portion 194. A washer 199 may be located over lip 195. In this regard, washer 199 is closer to first surface 202 of removable cargo handling component 200, as compared to lip 195. A width or diameter of washer 199, as measured at an outer circumference of washer 199, may be greater than the width or diameter of lip 195. Washer 199 may be located in a groove 197 defined by removable cargo handling component 200. Locating washer 199 in groove 197 may reduce or prevent vertical translation (i.e., translation in the direction of arrow 193) of coupling component 154 relative to removable cargo handling component 200. Locating washer 199 in groove 197 may also secure coupling component 154 to removable cargo handling component 200, thereby reducing a likelihood that coupling component 154 will become separated from removable cargo handling component 200, when convertible cargo handling assembly 100 is in bulk cargo mode (i.e., when removable cargo handling component 200 is not attached to fixed portion 152).

With combined reference to FIGS. 2A and 5, quick-connect fittings 150 may allow containerized handling components (e.g., balls mats 110, roller trays 120, and guide rails 130) to be quickly and easily installed into and removed from cargo compartment 12. When the containerized handling components are removed, the surface of fixed portion 152 may be even with surface 103 of mats 102, such that the floor and walls of cargo compartment 12 will comprise flush surfaces to reduce interference with bulk cargo. Quick-connect fittings 150 may also be less susceptible to foreign debris, as compared to track fittings.

Figure 6A:
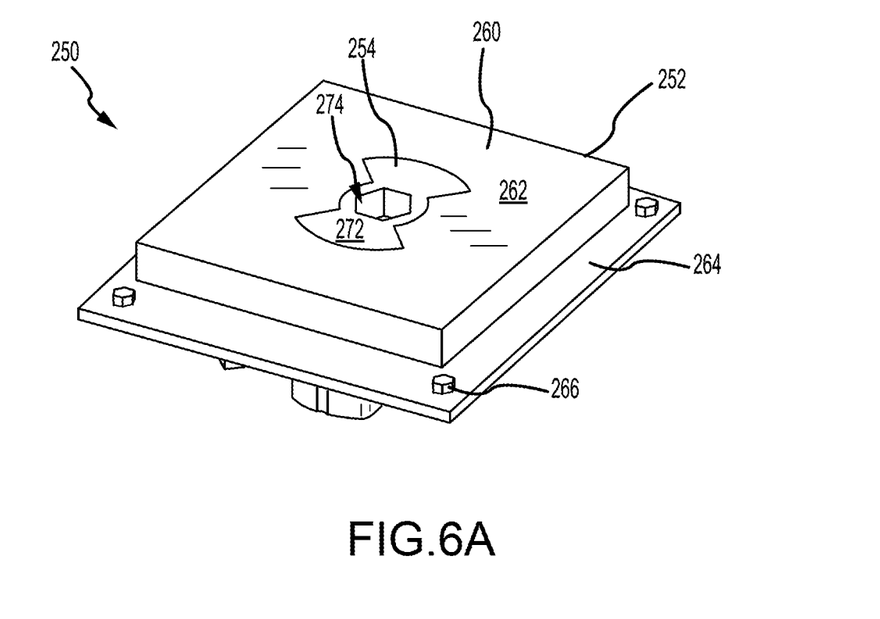
FIGS. 6A and 6B illustrate a quick-connect fitting in an unsecured position and in a secured position, respectively, in accordance with various embodiments.
Figure 6B:
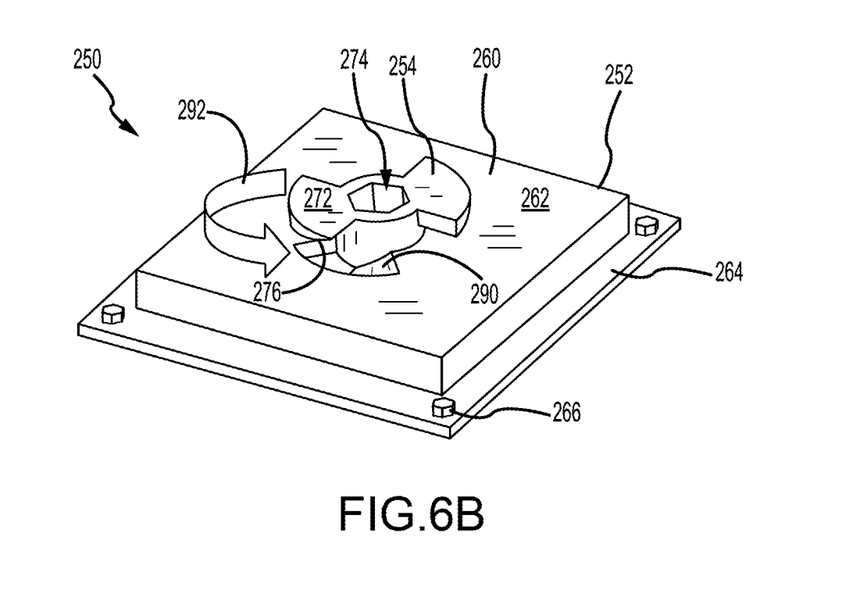

With reference to FIGS. 6A and 6B a quick-connect fitting 250 is illustrated, in accordance with various embodiments. FIG. 6A illustrates quick-connect fitting 250 in an unsecured position. FIG. 6B illustrates quick-connect fitting 250 in a secured position. Quick-connect fitting 250 includes a fixed portion 252 and a coupling component 254. In various embodiments, fixed portion 252 and quick-connect fitting 250 may replace one or more fixed portion(s) 152 and quick-connect fitting(s) 150, respectively, in convertible cargo handling assembly 100, with momentary reference to FIG. 2A. In various embodiments, fixed portion 252 includes a base portion 260. Coupling component 254 may be located through base portion 260. A flange 264 may surround a perimeter of base portion 260. When fixed portion 252 is installed in convertible cargo handling assembly 100, with momentary reference to FIG. 2A, mats 102 may be located on or over flange 264, such that a portion of mats 102 overlaps flange 264. Fixed portion 252 may be secured to aircraft frame structures 140 (FIG. 2A) via fasteners 266. Fasteners 266 may include screws, rivets, clips, nuts and bolts, or any other fastening device. In various embodiments, fasteners 266 may be located through flange 264. Base portion 260 includes a surface 262 configured to be flush with surface 103 of mats 102.

With combined reference to FIGS. 6A and 2C, a surface 272 of coupling component 254 is configured to be flush with surface 262 of base portion 260 and surface 103 of mats 102, when convertible cargo handling assembly 100 is in bulk cargo mode. Stated differently, surface 272 of coupling component 254 is configured to be flush with surface 262 of base portion 260 and surface 103 of mats 102, when quick-connect fitting 250 is in the unsecured position. Coupling component 254 may define a tool orifice 274. Tool orifice 274 is configured to receive and engage a tool having a geometry that is complementary to tool orifice 274. In this regard, tool orifice 274 is configured to engage a tool that facilitates rotation of coupling component 254 relative to fixed portion 252.

With combined reference to FIGS. 6B and 2B, upon rotation of coupling component 254 in the direction of arrow 292, surface 272 extends above surface 262. In various embodiments, base portion 260 may include a sloped surface 290, and coupling component 254 may include a sloped surface 276. Sloped surface 276 is generally opposite surface 272. Sloped surface 290 is oriented at a non-orthogonal angle relative to surface 262. For example, sloped surface 290 may be oriented at an angle of between 5° and 80° relative to a plane parallel to surface 262. Sloped surface 276 and surface 272 of coupling component 254 may form an angle between 10° and 80°. Sloped surfaces 290 and 276 may facilitate rotation of coupling component 254. As discussed in further detail below, the volume (or area) between sloped surface 276 and surface 262 is configured to receive a portion of a removable cargo handling component (e.g., a portion of ball mat 110, roller tray 120, or guide rail 130), thereby securing the removable cargo handling component to fixed portion 252.

Figure 7A:
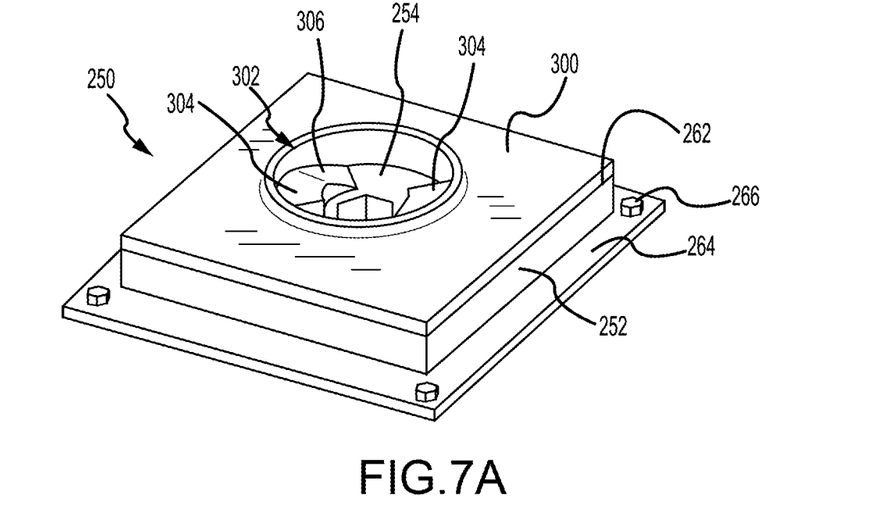
FIG. 7A illustrates a removable cargo handling component located over a quick-connect fitting, with the quick-connect fitting in an unsecured position, in accordance with various embodiments.
Figure 7B:
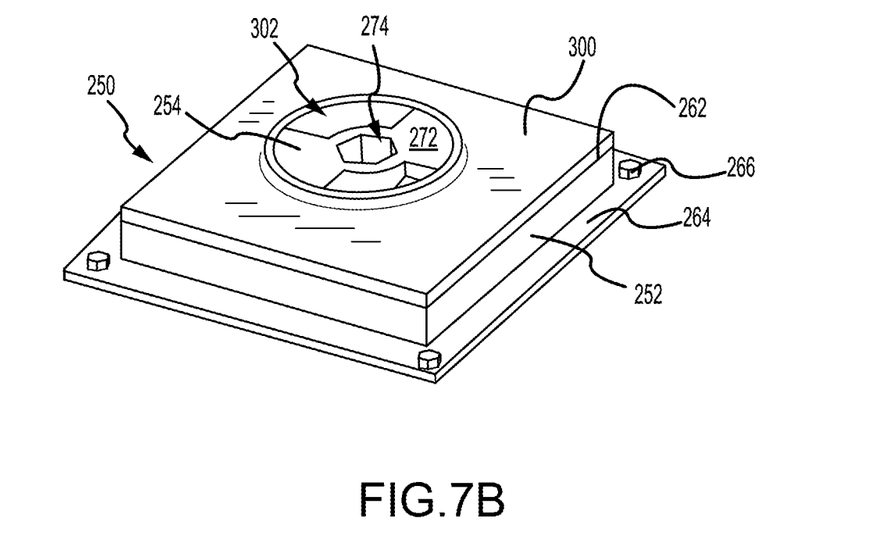
FIG. 7B illustrates a removable cargo handling component attached to a quick-connect fitting, with the quick-connect fitting in a secured position, in accordance with various embodiments.

With reference to FIGS. 7A and 7B securement of a removable cargo handling component 300 to fixed portion 252 of quick-connect fitting 250 is illustrated. In FIG. 7A, quick-connect fitting 250 is in an unsecured position (i.e., in the position illustrated in FIG. 6A, wherein surface 272 coupling component 254 is flush with surface 262) and removable cargo handling component 300 is movable relative to fixed portion 252. In FIG. 7B, quick-connect fitting 250 is in a secured position (i.e., in the position illustrated in FIG. 6B, wherein surface 272 of coupling component 254 is raised with respect to surface 262) and removable cargo handling component 300 is coupled or otherwise secured to fixed portion 252. Removable cargo handling component 300 may be a ball mat 110, a roller tray 120, or a guide rail 130 of convertible cargo handling assembly 100, with momentary reference to FIG. 2B. Removable cargo handling component 300 defines a channel 302 configured to receive coupling component 254. One or more protrusions 304 may be located in channel 302. Protrusions 304 include a sloped surface 306. Sloped surface 306 is oriented at a non-orthogonal angle relative to surface 262 of base portion 260. For example, sloped surface 306 may be oriented at an angle of between 5° and 80° relative to a plane parallel to surface 262.

With combined reference to FIGS. 7A, 7B, and 6B, as coupling component 254 is rotated in the direction of arrow 292, coupling component 254 slides over protrusions 304, such that protrusions 304 are located between sloped surface 276 of coupling component 254 and surface 262 of fixed portion 252. Sloped surface 306 of protrusions 304 may facilitate rotation and translation of coupling component 254. Locating protrusions 304 between sloped surface 276 of coupling component 254 and surface 262 of fixed portion 252 secures removable cargo handling component 300 to fixed portion 252.

Figure 8A:
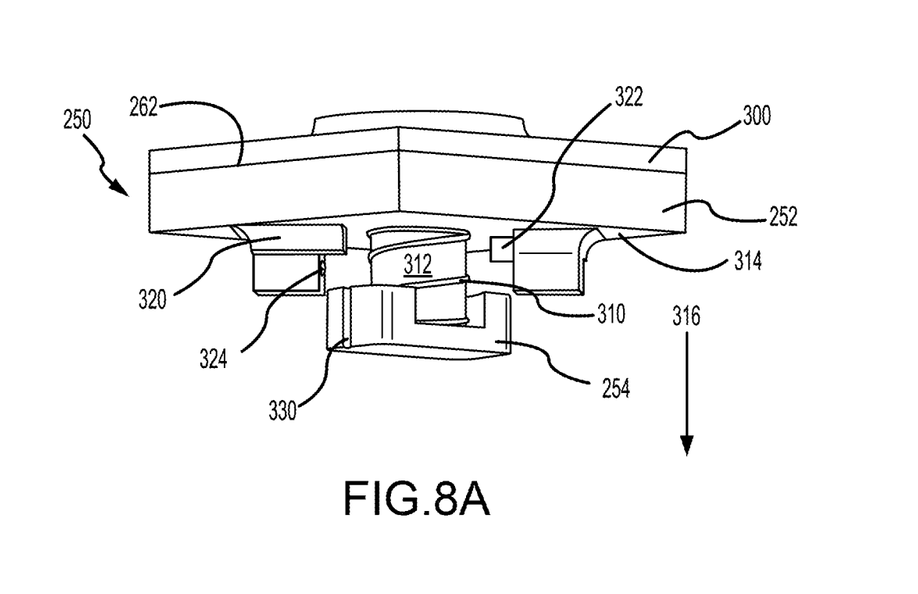
FIG. 8A illustrates a quick-connect fitting in an unsecured position, in accordance with various embodiments.
Figure 8B:
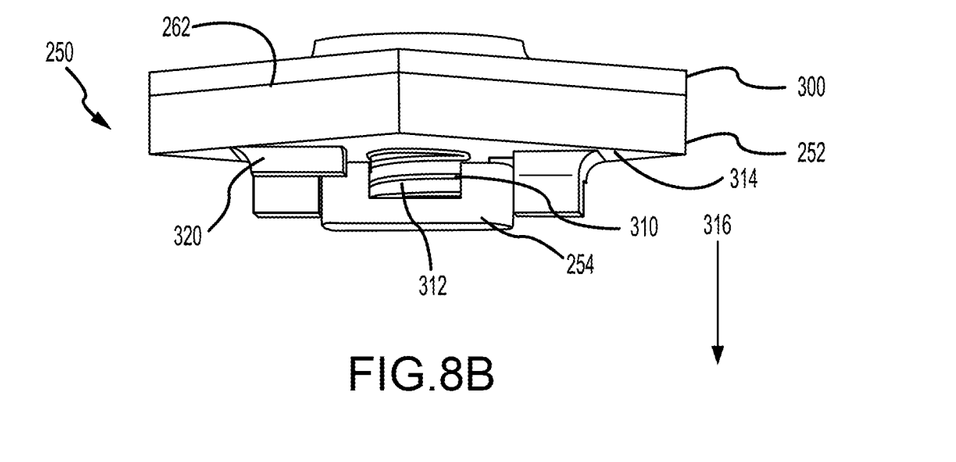
FIGS. 8B and 8C illustrate a quick-connect fitting in a secured position, in accordance with various embodiments.
Figure 8C:
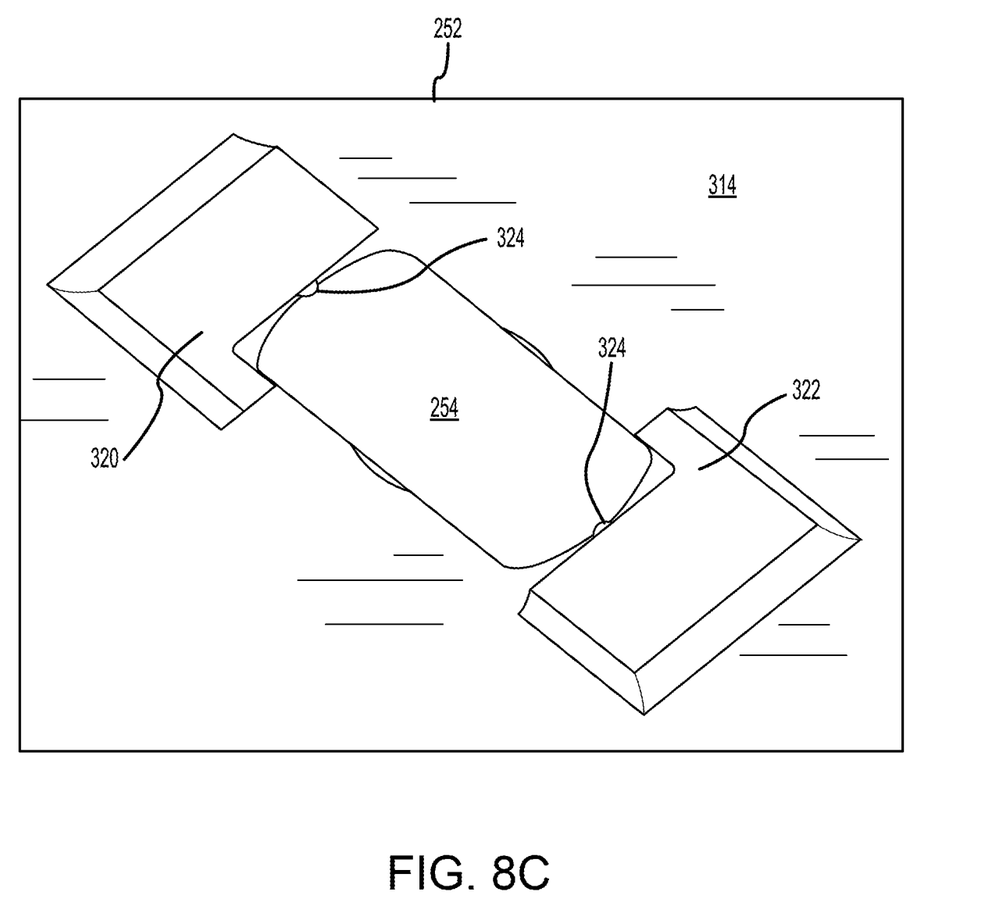

With reference to FIGS. 8A, 8B and 8C, additional components of quick-connect fitting 250 are illustrated. In FIG. 8A, quick-connect fitting 250 is in the unsecured position (i.e., in the position illustrated in FIG. 6A, wherein surface 272 coupling component 254 is flush with surface 262) and removable cargo handling component 300 is movable relative to fixed portion 252. In FIGS. 8B and 8C, quick-connect fitting 250 is in the secured position (i.e., in the position illustrated in FIG. 6B, wherein surface 272 of coupling component 254 is raised with respect to surface 262) and removable cargo handling component 300 is attached to fixed portion 252.

Quick-connect fitting 250 may include a biasing member 310 (e.g., a coil spring) coupled to coupling component 254. Biasing member 310 may be located around a shaft 312 of coupling component 254. Biasing member 310 may be located between coupling component 254 and a surface 314 of fixed portion 252. Biasing member 310 may apply a force to coupling component 254 in the direction of arrow 316. When quick-connect fitting 250 is in the unsecured position, with momentary reference to FIG. 6A, biasing member 310 may facilitate maintaining surface 272 of coupling component 254 in a position that is flush with surface 262 of fixed portion 252. When quick-connect fitting 250 is in the secured position, with momentary reference to FIG. 6B, biasing member 310 may facilitate maintaining contact between sloped surface 276 and protrusion 304 (FIG. 7a), which may reduce movement and/or rattling of removable cargo handling component 300.

Fixed portion 252 may include protrusions 320 and 322. Protrusions 320, 322 may extend from surface 314 of fixed portion 252. As shown in FIG. 8C, protrusions 320, 322 may generate an interference with coupling component 254. In this regard, protrusions 320, 322 may contact coupling component 254 to block further rotation of coupling component 254. Protrusions 320 and 322 may thus prevent or reduce over-rotation of coupling component 254. In various embodiment, coupling component 254 may rotate approximately 90° between the unsecure position and the secure position. As used in the previous context, "approximately" means±15°.

In various embodiments, a retractable bump 324 may extend from each of protrusion 320 and protrusion 322. Coupling component 254 may define grooves 330 (FIG. 8A) configured to receive bumps 324. Grooves 330 are positioned such that bumps 324 will be located in grooves 330, when quick-connect fitting 250 is in the secured position. Locating bumps 324 within grooves 330 may prevent or reduce unintentional rotation of coupling component 254. In this regard, bumps 324 may generate an interference with coupling component 254, thereby blocking coupling component 254 from rotating toward the unsecured position. Bumps 324 may be biased toward coupling component 254. In this regard, bumps 324 may be configured to retract into protrusions 320, 322, when a force greater than the biasing force is applied to bumps 324 by coupling component 254.

For example, an operator turning coupling component 254 may overcome the biasing force.

With combined reference to FIGS. 2A and 6B, quick-connect fittings 250 may allow containerized handling components (e.g., balls mats 110, roller trays 120, and guide rails 130) to be quickly and easily installed into and removed from cargo compartment 12. When the containerized handling components are removed, the surface of fixed portion 252 and coupling component 254 with be even with surface 103 of mats 102, such that the floor and walls of cargo compartment 12 will comprise flush surface to reduce interference with bulk cargo. Quick-connect fittings 250 may also be less susceptible to foreign debris, as compared to track fittings.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A quick-connect fitting for a convertible cargo handling assembly, comprising:
    a fixed portion configured to be secured to an aircraft frame structure, wherein the fixed portion further comprises:
        a base portion defining a threaded orifice; and
        a threaded cup located within the threaded orifice; and
    a coupling component coupled to a removable cargo handling component of the convertible cargo handling assembly, wherein the coupling component is configured to rotate relative to the fixed portion and wherein the removable cargo handling component comprises at least one of a ball mat, a roller tray, or a side guide.

2. The quick-connect fitting of claim 1, wherein the fixed portion comprises a threaded post.

3. The quick-connect fitting of claim 1, wherein the threaded cup includes a recessed surface.

4. The quick-connect fitting of claim 3, further comprising a cap located over the recessed surface.

* * * * *